United States Patent [19]

Dinallo, Sr.

[11] Patent Number: 4,943,601
[45] Date of Patent: Jul. 24, 1990

[54] COATING WITH IMPROVED ADHESION

[75] Inventor: Anthony J. Dinallo, Sr., Mechanicville, N.Y.

[73] Assignee: General Electric Company, Waterford, N.Y.

[21] Appl. No.: 332,820

[22] Filed: Apr. 3, 1989

[51] Int. Cl.$^5$ .............................................. C08K 5/24
[52] U.S. Cl. .................................. 524/265; 524/266; 524/267; 524/268; 524/731
[58] Field of Search ............... 524/265, 266, 267, 268, 524/731

[56] References Cited

U.S. PATENT DOCUMENTS 4,340,710 7/1982 Brown, Jr. .......................... 525/478

Primary Examiner—Melvyn I. Marquis

[57] ABSTRACT

A latent curable electronic coating composition is described which comprises:

a. a linear dimethylvinyl chainstopped polydimethylsiloxane fluid having a viscosity of about 500 to 5000 centipoise at 25° C.;
b. an organohydrogenpolysiloxane;
c. an amount of a platinum catalyst sufficient to cause the co-reaction of (a) and (b);
d. a combination of inhibiting agents comprised of (i) an ethylenically unsaturated isocyanurate and (ii) a dialkyl acetylenedicarboxylate; and
e. a silanol-containing dimethyl siloxane hydrolyzate having a silanol content from about 0.5% to about 1.5% and a viscosity from about 4 to about 40 centipoise at 25° C.

9 Claims, No Drawings

COATING WITH IMPROVED ADHESION

FIELD OF THE INVENTION

The present invention is directed to platinum catalyzed addition cured polydiorganosiloxane coating compositions utilizing polydimethylsiloxane adhesion promoters which exhibit improved adhesion to substrates.

BACKGROUND OF THE INVENTION

Silicone compositions are well known products offering premium properties in a wide variety of applications. For example, certain flexible silicone resin systems have been found useful as electronic conformal and junction coatings which are used for passivating and protecting semiconductor surfaces, and serve to assure optimal electrical performance. Such silicone materials are chosen since they offer rapid cure rates which improve production efficiency. The softness of these materials helps to minimize the vibration and shock experienced by such semiconductor devices and the low viscosity of such silicone coating compositions provides for ease of handling.

Such silicone electronic coatings are useful in a number of applications. A flexible conformal coating of such material can provide mechanical and electrical insulation prior to molding of plastic power transistors, for example. These materials can also be used a a light pipe or lens which insulates and isolates LED's and photocouplers and may be utilized with or without further encapsulation. These silicone junction coating materials are also a resilient coating which can be used directly over transistors, diodes and monolithic integrated circuit chips in order to prevent damage during and after final potting or sealing. Additionally, these coatings can be used as a thin section potting material for extra protection in cavity type packages in order to provide primary mechanical and chemical protection.

Brown in U.S. Pat. No. 4,340,710, incorporated herein by reference, discloses platinum-catalyzed one-package silicone electronic coating materials with good shelf life. Brown's products comprise a major amount of a vinyl functional linear siloxane fluid, an organohydrogenpolysiloxane, a platinum catalyst, and a combination of cure inhibitors comprised of an unsaturated isocyanurate and a dialkylacetylenedicarboxylate. These products are coated on a substrate and cured at temperatures from about 70° C. to 150° C.

Although Brown reports improved adhesion of his materials when compared to materials of the prior art, additional improvement has been found to be desirable, particularly in adhesion to thermoplastic resins such as polyolefins, polycarbonate, polyether, polyamide, polyimide resins, their mixtures, and the like.

It is an object of the invention to provide electronic coating compositions having improved adhesion to substrates.

This and other objects will become apparent to one skilled in the art upon consideration of the present specification and claims.

SUMMARY OF THE INVENTION

The objects of the invention are accomplished by providing an organopolysiloxane electronic coating composition comprising:

(a) an olefinorganopolysiloxane having structural units of the formula:

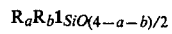

$$R_aR_b^1SiO_{(4-a-b)/2} \quad (I)$$

and (b) an organohydrogenpolysiloxane having structural units of the formula:

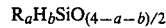

$$R_aH_bSiO_{(4-a-b)/2} \quad (II)$$

wherein R is an organic radical attached to silicon by a C-Si linkage and is selected from the group consisting of monovalent hydrocarbon radicals, halogenated monovalent, hydrocarbon radicals, and cyanoalkyl radicals; generally, R contains from 1-30 atoms, straight or branched chained, preferably from 1-12 carbon atoms, and most preferably 1-8 carbon atoms: $R^1$ is an olefinic hydrocarbon radical attached to silicon by a C-Si linkage and generally contains from 1-20 aliphatic carbon atoms, linked by multiple bonds (e.g., vinyl, allyl, methallyl, butenyl, pentenyl, ethynyl and the line); a has a value of 0 to 3, inclusive and preferably from 0.5 to about 2, inclusive, b has a value from 0.005 to 2.0, inclusive and the sum of a and b is equal to from 0.8 to 3, inclusive, (c) a platinum catalyst, (d) a combination of inhibiting agents comprised of (i) an ethylenically unsaturated isocyanurate corresponding to the structural formula:

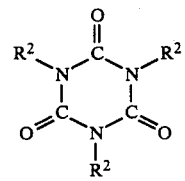

(III)

wherein $R^2$ is the same or different and is selected from the group consisting of hydrogen, lower alkyl, aryl, aralkyl, polynuclear aryl, heteroaryl, monofunctional lower-alkenyl and substituted derivatives thereof with the proviso that at least one $R^2$ is monofunctional lower-alkenyl; and (ii) a dialkylacetylenedicarboxylate which together are present in an amount sufficient to prevent premature gelation of the catalyzed coating composition but which will not prevent curing of the coating at elevated temperatures, and (e) a low molecular weight silanol-containing dimethylsiloxane hydrolyzate having a silanol content from about 0.5% to about 1.5% and a viscosity from about 4 centipoise to about 40 centipoise at 25° C.

DETAILED DESCRIPTION OF THE INVENTION

In particular, the olefinorganopolysiloxanes having structural units represented by Formula I hereinabove are intended to broadly cover fluid organopolysiloxanes which preferably, but not necessarily, are free of silanic hydrogen, and contain olefinic unsaturation by means of double or triple bonds between two adjacent aliphatic carbon atoms. Among the radicals which $R^1$ represents in Formula I hereinabove are included alkyl, such as methyl, ethyl, propyl, isopropyl, butyl, octyl, dodecyl, and the like; cycloalkyl, such as cyclopentyl, cyclohexyl, cycloheptyl, and the like; aryl, such as phenyl, naphthyl, tolyl, xylyl, and the like; aralkyl, such as benzyl, phenylethyl, phenylpropyl, and the like; halogenated derivatives of the aforesaid radicals including chloromethyl, trifluoromethyl, chloropropyl, chlorophenyl, dibromophenyl, tetrachlorophenyl, difluorophenyl, and the like; cyanalkyl, such as betacyano ethyl, gamma-cyanopropyl, beta-cyanopropyl and the like. Preferably R is methyl. Moreover, Formula I is intended to include those materials wherein R is a mixture of the aforesaid radicals.

Among the radicals represented by $R^1$ in Formula I hereinabove are included alkenyl, such as vinyl, allyl, methallyl, butenyl, pentenyl, and the like; and alkynyl, such as ethynyl, propynyl, butynyl, pentynyl and the like. Preferably R' is vinyl or allyl and most preferably R' is vinyl.

The olefinorganopolysiloxanes within the scope of Formula I are well known in the art, particularly U.S. Pat. No. 3,344,111 to Chalk and U.S. Pat. No. 3,346,366 to Modic, which are incorporated herein by reference. Similarly, their preparation and/or commercial availability is also well known.

Specific materials included within the scope of the olefinorganopolysiloxanes of Formula I hereinabove are low molecular weight materials, such as vinylpentamethyldisiloxane, 1,3-divinyltetramethyldisiloxane, 1,1,3-trivinyltrimethyldisiloxane, 1,1,1,3-tetravinyldimethyldisiloxane, as well as higher polymers containing up to 100,000 or more silicon atoms per molecule. Also included within the scope of the olefinorganopolysiloxanes of Formula I are cyclic materials containing silicon-bonded vinyl or allyl radicals, such as the cyclic trimer, tetramer or pentamer of methylvinylsiloxane

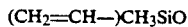
$(CH_2=CH-)CH_3SiO$ or methyl allylsiloxane

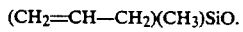
$(CH_2=CH-CH_2)(CH_3)SiO.$

Among these cyclic materials, tetramethyltetrallylcyclotetrasiloxane and tetramethyltetravinylcyclotetrasiloxane are preferred.

The olefinorganopolysiloxanes encompassed within the scope of the present invention can be characterized as copolymers of (1) siloxane units having the formula:

$$R_c R^1_d SiO_{(4-c-d)/2} \qquad (IV)$$

where R and $R^1$ are defined above and c has a value of from 0 to 2, inclusive, and the sum of c and d is equal to from 1.0 to 3.0 inclusive, and (2) an organopolysiloxane having the structural formula:

$$R_n SiO_{(4-n)/2} \qquad (V)$$

where R is as defined above and n has a value of from 0.8 to 2.5, inclusive. Thus, where the olefinorganopolysiloxane employed herein is a copolymer of units within the scope of formula IV with an organopolysiloxane having an average formula within the scope of Formula V, the copolymer generally contains from 0.5 to 99.5 mole percent of units within the scope of Formula V. The preparation of these copolymers is also well known in the art.

A preferred class of organopolysiloxane compositions within the scope of the present invention are those disclosed by Modic in U.S. Pat. No. 3,436,366, incorporated herein by reference. These compositions comprise (1) 100 parts by weight of a liquid vinyl chainstopped polysiloxane having the formula:

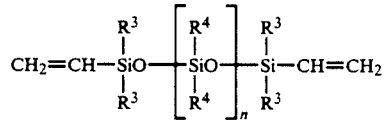

wherein $R^3$ and $R^4$ are monovalent hydrocarbon radicals free of aliphatic unsaturation, with at least 50 mole percent of the $R^4$ groups being methyl, and where n has a value such that the electronic coating compositions of the present invention have a viscosity of, approximately, 500 to 5,000 centipoise at 25° C. and (2) from 20 to 50 parts by weight an organopolysiloxane copolymer comprising $(R^5)_3SiO_{0.5}$ units, where each $R_5$ individually is a member selected from the class consisting of vinyl radicals and monovalent hydrocarbon radicals free of aliphatic unsaturation, where the ratio of $(R^5)_3SiO_{0.5}$ units to $SiO_2$ units is from about 0.5:1 to 1:1, and where from about 2.5 to 10 mole percent of the silicon atoms contain silicon-bonded vinyl groups. The vinyl chain-stopped organopolysiloxane component (1) is typified by various compositions where the monovalent hydrocarbon radicals represented by $R^3$ and $R^4$ include alkyl radicals, e.g., methyl, ethyl, propyl, butyl, octyl, etc.; aryl radicals, e.g., phenyl, tolyl, xylyl, etc.; cycloalkyl radicals, e.g., cyclohexyl, chcloheptyl, etc.; aralkyl radicals e.g., benzyl, phenylethyl, etc. Preferably, all of the radicals represented by $R^3$ and $R^4$ selected from the group consisting of methyl and phenyl radicals and most preferably $R^3$ and $R^4$ are methyl. In the organopolysiloxane copolymer component (2) $R^5$ can be vinyl and/or monovalent hydrocarbon radicals free of aliphatic unsaturation, with at least the stated proportion of $R^5$ groups being vinyl. The $R^5$ groups which are not vinyl are of the same scope as the $R^3$ and $R^4$ groups and like these, are preferably methyl.

The organohydrogenpolysiloxanes having structural units represented by Formula II above are intended to broadly cover fluid organopolysiloxanes which are preferably, but not necessarily, free of olefinic unsaturation, but which contain silanic hydrogen. These organohydrogenpolysiloxanes represented by Formula II hereinabove are also known in the art as particularly manifested by U.S. Pat. No. 3,334,111 by Chalk, and U.S. Pat. No. 3,436,366, previously incorporated herein by reference.

Among the radicals represented by R in Formula II, above, similarly to R in Formula I above, are included alkyl, such as methyl, ethyl, propyl, isopropyl, butyl, octyl and the like; cycloalkyl, such as cyclopentyl, cyclohexyl, cycloheptyl and the like; aryl, such as phenyl, napthyl, tolyl, xylyl, and the like, aralkyl, such as benzyl, phenylethyl, phenylpropyl, and the like; halogenated derivatives of the above radicals, including chloromethyl, trifluoromethyl, chloropropyl, chlorophenyl, dibromophenyl, tetrachlorophenyl, difluorophenyl and the like; cyanoalkyl, such as beta-cyanoethyl, gamma-cyanopropyl, beta-cyanopropyl and the like. Also intended to be included within the scope of Formula II are those materials where R is a mixture of the aforesaid radicals. Preferably the R group of Formula II is methyl.

Materials specifically encompassed within Formula II hereinabove, include 1,3-dimethyldisiloxane, 1,1,3,3,- tetramethyldisiloxane, as well as higher polymers containing up to 100,000 or more silicon atoms per molecule. Also included within the scope of Formula II hereinabove are cyclic materials, such as cyclic polymers of methyl hydrogen siloxane having the formula:

$$(CH_3SiHO)_x$$

wherein x is a whole number equal to from 3 to 10 or more. Particularly included is tetramethylcyclotetrasiloxane.

The organohydrogenpolysiloxanes employed in the practice of the present invention can also be characterized as copolymers containing at least one unit per molecule having the formula:

$$R_cH_dSiO_{(4-c-d)/2} \qquad (VI)$$

with the remaining siloxane units in the organopolysiloxane being within the scope of Formula V above, where R, c, d and n are defined above.

Within the scope of Formula VI are siloxane units, such as hydrogen siloxane units $HSiO_{1.5}$, methyl hydrogen siloxane units $(CH_3)HSiO$, dimethyl hydrogen siloxane units $(CH_3)_2HSiO_{0.5}$, and dihydrogen siloxane units $H_2SiO$. In these copolymers, the siloxane units of Formula V and VI are present in proporations so as to form a hydrogenpolysiloxane within the scope of Formula II above. In general, these copolymers contain from 0.5 to 99.5 mole percent of the siloxane units of Formula VI.

The platinum catalyst component employed in the compositions of the present invention includes all of the well known platinum catalysts which are effective for catalyzing the reaction between silicon-bonded hydrogen groups and silicon-bonded olefinic groups. These materials include, for example, finely divided elemental platinum catalysts, such as those described in U.S. Pat. No. 2,970,150 to Bailey, the chloroplatinic acid catalysts described in U.S. Pat. No. 2,823,218 to Speier, the platinum hydrocarbon complexes shown in U.S. Pat. No. 3,159,601 to Ashby and U.S. Pat. No. 3,159,662 to Ashby, as well as the platinum alcoholate catalysts described in U.S. Pat. No. 3,220,972 to Lamoreaux. Moreover, the platinum chloride-olefin complexes described in U.S. Pat. No. 3,516,946 to Modic are also used herein. All of the aforesaid U.S. patents are intended to be incorporated herein by reference.

The ethylenically unsaturated isocyanurates of Formula III above in combination with the dialkylacetylenedicarboxylates described below provide the organopolysiloxane compositions of the present invention with desirable latent curing properties. Thus, as a result of their presence, the organopolysiloxane compositions of the present invention are inhibited to premature gelation, i.e., room temperature curing, and therefore can be stored for extended periods of time, for example about two years, and subsequently cured with the application of heat without loss of desired hardness or surface properties to the final cured product.

Referring to Formula III above, which represents the ethylenically unsaturated isocyanurate cure inhibitors within the scope of the present invention, R" may be the same or different and is selected from the group consisting of hydrogen, alkyl, aryl, aralkyl, polynuclear aryl, heteroaryl, monofunctional lower-alkenyl, and non-interfering substituted derivatives thereof, with the proviso that at least one R" is monofunctional lower-alkenyl. Alkyl and substituted alkyl are intended to include one to about 20 carbon atoms, straight or branch chained, and include, for example, methyl, ethyl, chloroethyl, cyanopropyl, propyl, isopropyl, butyl, dibromobutyl, isobutyl, pentyl, hexyl, dodecyl and the like. By aryl, aralkyl, polynuclear aryl, heteroaryl and non-interfering substituted derivatives thereof is intended to include phenyl, chlorophenyl, dibromophenyl, naphthyl, benzyl, pyridyl, cyanophenyl, tolyl, xylyl, phenanthryl and the like. By non-interfering substituted derivatives is meant those functionalities that do not render the platinum catalysts completely ineffective. Monofunctional lower-alkenyl is intended to include two to about six carbon atoms, straight or branch chained, containing one carbon to carbon double bond, and includes, for example, vinyl, allyl, butenyl, isobutenyl, pentenyl, hexenyl, and the like. Preferably, at least one R" is allyl and most preferably all three R" groups are allyl.

Specific materials within the scope of Formula III are, for example, triallylisocyanurate, diallylisocyanurate, diallylethylisocyanurate, tributenylisocyanurate and diallylphenylisocyanurate. Triallylisocyanurate and diallylisocyanurate are preferred. Triallylisocyanurate is the most preferred.

The ethylenically unsaturated isocyanaurates presented by Formula III hereinabove are either commercially available or are conveniently prepared. Included among the procedures for their preparation known in the art is the reaction of the appropriate organic halide or mixture of the appropriate organic halides with potassium isocyanate in any dipolar, aprotic solvent medium, such as N,N-dimethyl formamide (DMF), dimethylsulfoxide (DMSO), hexamethylphosphorus triamide (HMPA) and the like. Illustrated pictorially and using allyl chloride, for example, as the appropriate organic halide this reaction is represented in the following manner:

$$3CH_2=CHCH_2Cl + KNCO \rightarrow (CH_2=CHCH_2\text{-}NCO)_3 + 3KCl$$

The temperature for this reaction can range from ambient to about 150° C. Similarly, trimethallylisocyanurate, tributyenylisocyanurate, triisobutenylisocyanurate, diallylethylisocyanurate, allyldiethylisocyanurate, diallylbenzylisocyanurate and the like are prepared by using the appropriate alkenyl halide or mixture of alkenyl halide and alkyl halide and/or aralkyl halide in the above reaction scheme. diallylisocyanurate and triallylisocyanurate are commercially available from the Allied Chemical Company.

The other inhibitors utilized by the present invention are dialkylacetylenedicarboxylates which result from the diesterification reaction of 2-butynoic dicarboxylic acid with two equivalents of alcohols such as methanol, ethanol, butanol, benzylic alcohol, allyl alcohol or mixtures of such alcohols. Such reactions can be represented as:

$$HOOC\equiv CCOOH + 2ROH \rightarrow ROOCC\equiv C\text{-}COOR + 2H_2O, \text{ or}$$

$$HOOC\equiv CCOOH + ROH + R'OH \rightarrow ROOCC\equiv C\text{-}COOR' + 2H_2O$$

Useful, diesters prepared in this fashion include dimethylacetylenedicarboxylate, diethylacetylenedicarboxylate, dibutylacetylenedicarboxylate, methylbutylacetylenedicarboxylate, methylethylacetylenedicarboxylate, etc. Particularly useful for the practice of the present invention are those diesters where R represents methyl or ethyl groups. The proportions of the various ingredients employed in the compositions of the present invention can vary within wide limits. The proportions of the ingredients are affected by the stoichiometry of the addition reactants involved since many of the final products prepared from the compositions of the invention exhibit satisfactory properties for intended purposes even when the final product contains unreacted silicon-bonded olefinic radicals or unreacted silicon-hydrogen linkages. For economic and commercial purposes it is generally preferred that the olefinorganopolysiloxane and the organohydrogenpolysiloxane be present in such proportions that the composition contains from about 0.005 to 20 silicon-hydrogen linkages per silicon-bonded olefin radical. However, it is often most desirable to have an equal number of silicon-hydrogen linkages and olefin groups in the composition so as to produce a final product which is substantially free of either silicon-hydrogen linkages or silicon-bonded olefin radicals.

Regardless of the type of platinum catalyst employed, it is generally present in an amount sufficient to cause the co-reaction of the olefinorganopolysiloxane and the organohydrogenpolysiloxane. Thus, satisfactory results may be obtained when the platinum catalyst is present in amounts sufficient to provide as little as one atom of platinum per million silicon-bonded olefin radicals in the olefinorganopolysiloxane. On the other hand, amounts of the platinum catalyst sufficient to provide as high as one to 10 platinum atoms per 1,000 silicon-bonded olefin radicals may also be used. In general, however, it is preferred to employ the platinum catalyst in an amount sufficient to provide one platinum atom per one thousand to one million silicon-bonded olefin radicals in the olefinorganopolysiloxane ingredient. Ordinarily, approximately 5 to 50 parts platinum metal per million parts olefinorganopolysiloxane will be sufficient to initate the necessary co-reaction.

The amount of the ethylenically unsaturated isocyanurate and the dialkylacetylenedicarboxylate employed in the practice of the present invention also varies within wide limits depending upon various conditions. These conditions are, for example, the amount of platinum catalyst used, the particular olefinorganopolysiloxane and organohydrogenpolysiloxane employed, and also the degree of cure inhibition desired. Generally, however, these materials are present in an amount sufficient to inhibit premature gelation, i.e., cure at toom temperature, but insufficient to prevent cure at elevated temperature. More particularly, the ethylenically unsaturated isocyanurate compound of this invention may be present in an amount in the range of from about 0.01 to about 5 weight percent of the total composition, and preferably from about 0.5 to about 2 weight percent of the total composition. Similarly the dialkylacetyledicarboxylate constituent may be present in an amount in the range of 0.05 to 2.0 weight percent of the total composition and preferably from 0.1 to 1.0 weight percent of the total composition.

The low molecular weight silanol-containing dimethylsiloxane hydrolyzate adhesion promoters of the invention having a silanol content from about 0.5% to about 1.5% and a viscosity from about 4 to about 40 centipoise at 25° C. are generally prepared by hydrolysis of a dimethyldihalosilane such as dimethyldichlorosilane at a temperature below about 55° C. Following reaction the organosilicon product is decanted from the aqueous acid formed, washed with water, decanted, and neutralized with sodium carbonate. The organosilicon product is a mixture of about 40-60% cyclic dimethylsiloxanes having from about 3 to about 6 siloxy groups and about 60-40% hydroxyl-terminated linear dimethylsiloxane telomers having a viscosity from about 4 to about 40 centipoise at 25° C., commonly known as dimethylsiloxane hydrolyzate.

The mechanism by which the inclusion of the silanol-containing dimethylsiloxane hydrolyzate acts to improve the adhesion of the coating to various substrates such as aluminum, steel, and other metals and plastics such as polyethers, polycarbonates and the like is not well understood. It is well known that reducing the viscosity of liquids often increases their wetting ability, and good wetting of a substrate by a liquid coating usually is required to obtain good adhesion of the resulting cured coating. It does not appear that lowering viscosity is responsible for the improved adhesion of coatings of the invention which employ the hydrolyzate as the adhesion promoter. When a low molecular weight (5 cps) trimethylsiloxy end-blocked linear dimethylsiloxane fluid is substituted for the hydrolyzate in the coating compositions, little or no improvement in adhesion of the cured coating is observed. Inclusion of as little as about 0.5% of hydrolyzate in the one package coating composition provides a significant increase in adhesion of the composition to a variety of substrates. Maximum improvement in adhesion has been observed when about 1.6% of hydrolyzate is used in the composition. Increasing the amount to about 2.5% does not confer any additional benefit, and indeed may give less satisfactory results than the use of lesser quantities, but the adhesion is superior to that observed when no additive is used.

The latent addition curable organopolysiloxane coating compositions of the present invention can be prepared by mixing, in any suitable fashion, all of the components described hereinabove, in a one-package system. As a result of the latent curing ability of the present compositions, these premixed compositions can be stored as such and kept at ambient room temperature for extended periods of time until ready to be used. Thus, they provide extended work life without concern for premature gelling.

In general, the compositions of the present invention are cured at elevated temperatures in the range of from about 100° C. to 150° C. Complete cure time generally ranges from about one-half hour to about five hours. Of course, these and other details concerning the curing of the compositions of this invention depend upon their particular composition and application and are within the knowledge of those skilled in the art.

EXAMPLE 1

Base Fluid A which is useful as a component in one package electronic junction coating compositions which will be described in subsequent examples was provided by combining 75 parts by weight linear dimethylvinyl chainstopped polydimethylsiloxane fluid (vinyl fluid stock) having a viscosity of about 3000 to 4000 centipoise at 25° C., 25 parts by weight of a copolymer of trimethylsiloxane units, $SiO_2$ units and methylvinylsiloxane units, wherein there were approximately 0.8 trimethylsiloxane units per $SiO_2$ unit and approximately 7.0 mole percent of the silicon atoms were present as methylvinylsiloxane units and the remaining silicon atoms were present as a portion of the trimethylsiloxane or SiO₂ units. This material is in the nature of a vinyl MQD resin. The 25 parts by weight of this resin were incorporated into Base Fluid A as 41.7 parts of a 60% silicone resin solids by weight solution in toluene or xylene. The mixture was then heated under reduced pressure to strip off most of the aromatic solvent. After cooling the stripped mixture to ambient temperature, platinum catalyst was added to provide approximately 10 parts platinum metal per million parts of Base Fluid A. The platinum utilized was platinum complexed with octyl alcohol as taught in U.S. Pat. No. 3,220,972 (Lamoreaux) which is hereby incorporated by reference.

EXAMPLE 2

A one package coating composition was prepared by first combining 100 parts by weight of Base Fluid A from Example 1 with 0.39 parts by weight of triallylisocyanurate, 0.13 parts by weight of dimethylacetylenedicarboxylate, and 1.4 parts by weight of a mixture of 10 parts by weight of a dimethylsiloxane hydrolyzate having a viscosity of about 10 centipoise at 25° C. with 1 part of Meteor 7890 Black (Harshaw) and mixed thoroughly for 30 minutes. Ten parts of a mixture of 50% by weight of the vinyl fluid used in Example 1 with 50% by weight of a low viscosity (approximately 10 centipoise) liquid copolymer of dimethylhydrogensiloxane units and SiO₂ units containing an average of two dimethylhydrogensiloxane units per SiO₂ unit (hereinafter called Base Fluid B) was then added. The combined ingredients were thoroughly mixed for one hour to yield a product having a viscosity of about 3300 centipoise.

The product was coated on aluminum and on the polymer side of a kraft paper-polyethylene laminate and cured at 110° C. using a long (12 hr.) and a short (1 hr.) heating cycle. A well-cured adherent coating was obtained on each substrate. Better adhesion was observed for the samples cured for 12 hours. Additional evaluations of cured coatings of the material of this Example are shown in Example 5.

EXAMPLE 3 and COMPOSITION A

A composition of the invention similar to that of Example 2 was prepared in which the Meteor Black pigment was omitted and the amount of dimethylsiloxane hydrolyzate was increased to 1.63% of the total weight of the composition.

Another composition similar to that of Example 2 was prepared in which the dimethylsiloxane hydrolyzate of the invention was also omitted (Composition A) Glass-reinforced plastic printed circuit board coupons were rinsed and scrubbed with Freon TMS and air dried. Coupons were dip coated in duplicate with the composition of the invention and Composition A, allowed to drain and then cured in a oven at 120-125° C. After curing, the coated coupons were allowed to cool to room temperature. The coatings were tested for adhesion by rubbing with the thumb. The composition of the invention was significantly more difficult to remove from the substrate than Composition A, the latter showing little or no adhesion to the circuit board.

EXAMPLE 4

The preparation of Example 2 was repeated but the amount of the dimethylsiloxane hydrolyzate - Meteor 7890 mixture was increased to 3.4 parts. The product as prepared had a viscosity of about 2100 centipoise. Comparative results of cured coatings of the material of this Example are shown in Example 5.

COMPOSITION B

A pigmented one package coating composition was prepared by first mixing 70.21 parts of Base Fluid A with 28.37 parts of 5μ alpha-quartz (Minusil) and 1.42 parts of a mixture of ⅔ black pigment (Kenrich K8124 T)and ⅓ vinyl fluid used in Example 1. The 100 parts by weight the resulting mixture was combined with 0.27 parts by weight of triallylisocyanurate, 0.11 parts by weight of dimethylacetylenedicarboxylate, and 14.3 parts by weight of a trimethylsilyl end-blocked polydimethylsiloxane fluid having a viscosity of about 5 centipoise at 25° C. This mixture was stirred for one hour. The 10 parts of a mixture of 64.3 parts of the vinyl fluid used in Example 1 and 35.7 parts of the liquid copolymer of Example 2 was added, and the mixture was stirred for 30 minutes to yield a product having a viscosity of about 2070 centipoise at 25° C. Evaluations of cured coatings of this material are described in Example 5.

EXAMPLE 5

Aluminum, steel, Noryl ®100 and Delco glass filled thermoplastic (90% Noryl ®, 10.% Lexan ®) coupons were wiped three times with a paper wipe saturated with isopropanol. The coupons were air-dried for 10-15 minutes and then the compositions listed in Table I below were each poured on individual coupons to obtain a thickness of 5-10 mils over 70% of the coupon, leaving the remaining 30% uncoated. The coated specimens were immediately placed in an oven set at 150° C. and cured for 3.5 hours.

The cured specimens were allowed to cool for one hour. Lifting the coating from the substrate by lifting-/pushing at the parting line with the thumbnail was attempted. Results were defined as follows:

| | |
|---|---|
| Poor - | No adhesion whatsoever, coating can be lifted/pulled off the substrate intact. (adhesive failure) |
| Fair - | Some adhesion occurs but coating can be picked up and removed from substrate nearly intact. (adhesive/cohesive failures) |
| Good - | Well adhered - can't be removed from substrate without breaking coating. (cohesive failure). |
| Excellent - | coating can't be lifted without thumbnail underneath it at all times. (all failures are cohesive). |

TABLE I

| | Substrate | | | |
|---|---|---|---|---|
| Composition | Aluminum | Delco ® | Steel | Noryl ® |
| Example 2 | good | good-excellent | excellent | good-excellent |
| Example 4 | fair | fair-good | good | poor-good |
| Composition B | poor-fair | poor | poor | poor |

The data of Table I clearly show that the use of the silanol -and cyclic- containing dimethylsiloxane hydrolyzate adhesion promoter of the invention affords superior results when compared to the use of a low molecular weight trimethylsiloxy end-blocked linear dimethylsiloxane fluid.

What is claimed:

1. A latent curable electronic coating composition stabilized against premature gelation comprising:
   a. an olefinorganopolysiloxane having units of the structural formula:

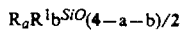
   $R_a R^1_b SiO_{(4-a-b)/2}$ b. an organohydrogenpolysiloxane having units of the structural formula:

   $R_a SiH_b SiO_{(4-a-b)/2}$ wherein R is selected from the group consisting of a monovalent hydrocarbon radical, a halogenated monovalent hydrocarbon radical, a cyanoalkyl radical and mixtures thereof, $R^1$ is an olefinic hydrocarbon radical, wherein a has a value of from 0 to 3, inclusive, b has a value of from 0.005 to 2.0 inclusive, and the sum of a and b is equal to from 0.8 to 3, inclusive,
   c. a sufficient amount of a platinum catalyst to cause the co-reaction of (a) and (b);
   d. a combination of inhibiting agents comprised of (i) an ethylenically unsaturated isocyanurate corresponding to the structural formula:

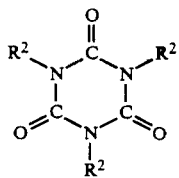
   (III)

wherein $R^2$ is the same or different and is selected from the group consisting of hydrogen, alkyl, aryl, aralkyl polynuclear aryl, heteroaryl, monofunctional lower-alkenyl and the non-interfering substituted derivatives thereof with the proviso that at least one $R^2$ is lower-alkyl and (ii) a dialkylacetylenedicarboxylate having the structural formula:

   ROOCC≡CCOOR wherein R is as described above and wherein said combination of ethylenically unsaturated isocyanurate and said dialkylacetylenedicarboxylate is present in an amount sufficient to inhibit premature gelation but insufficient to prevent cure at elevated temperature; and
   e. a silanol-containing dimethylsiloxane hydrolyzate having a silanol content from about 0.5% to about 1.5% and a viscosity from about 4 centipoise to about 40 centipoise at 25° C.

2. A composition as in claim 1 wherein said olefinorganopolysiloxane is comprised essentially of a linear dimethylvinyl chainstopped polydimethylsiloxane fluid having a viscosity of, approximately, 500 to 5000 centipoise at 25° C.

3. A composition as in claim 1 wherein said organohydrogenpolysiloxane is comprised essentially of units selected from the group consisting of $(H_2SiO)_{1.5}$ units, $(H\ SiCH_3O)$ units, $(CH_3)H\ SiO_{0.5}$ units and $(H_2SiO)$ units.

4. A composition as in claim 1 wherein said platinum catalyst is present in an amount sufficient to provide, approximately, 1 to 50 parts platinum metal per million parts of said olefinorganopolysiloxane.

5. A composition as in claim 1 wherein said ethylenically unsaturated isocyanurate is triallylisocyanurate.

6. A composition as in claim 1 wherein said dialkylacetylenedicarboxylate is dimethylacetylenedicarboxylate.

7. A composition as in claim 1 wherein there is present, approximately, 0.01 to 5.0 percent by weight of said ethlenically unsaturated isocyanurate based upon the total weight of said coating composition.

8. A composition as in claim 1 wherein said dialkylacetylenedicarboxylate is present in an amount of, approximately, 0.05 to 2.0 weight percent of said coating composition.

9. A composition as in claim 1 which has been cured at elevated temperature upon a substrate.

* * * * *